(12) United States Patent
Ooguri

(10) Patent No.: US 8,762,670 B2
(45) Date of Patent: Jun. 24, 2014

(54) STORAGE DEVICE AND STORAGE DEVICE CONTROL METHOD

(75) Inventor: Noboru Ooguri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 13/022,168

(22) Filed: Feb. 7, 2011

(65) Prior Publication Data

US 2011/0197042 A1     Aug. 11, 2011

(30) Foreign Application Priority Data

Feb. 8, 2010    (JP) .................................. 2010-25978

(51) Int. Cl.
*G06F 12/16*     (2006.01)
(52) U.S. Cl.
USPC .......... 711/162; 711/4; 711/154; 711/E12.103
(58) Field of Classification Search
USPC ............................... 711/4, 154, 162, E12.103
See application file for complete search history.

(56) References Cited

U.S. PATENT DOCUMENTS

| 6,288,862 | B1 | | 9/2001 | Baron et al. | |
|---|---|---|---|---|---|
| 7,647,449 | B1 | * | 1/2010 | Roy et al. | ....................... 711/112 |
| 2006/0047894 | A1 | * | 3/2006 | Okumura | ....................... 711/111 |
| 2008/0005465 | A1 | * | 1/2008 | Matthews | ....................... 711/113 |
| 2008/0228788 | A1 | * | 9/2008 | Kaneko | ........................ 707/100 |

FOREIGN PATENT DOCUMENTS

| JP | 2003-510745 A | 3/2003 |
|---|---|---|
| JP | 2005-332043 A | 12/2005 |

* cited by examiner

*Primary Examiner* — Jasmine Song
(74) *Attorney, Agent, or Firm* — Fujitsu Patent Center

(57) ABSTRACT

A storage device for storing data includes, a first storage part which stores data, a second storage part which stores backup data of the data stored in the first storage part, a writing order determination part which determines a writing order of data to the second storage part such that the writing order is an order from data whose storage period remains longest to data whose storage period remains shortest, and a writing control part which performs control such that the data stored in the first storage part is written to the second storage part in accordance with the writing order.

6 Claims, 9 Drawing Sheets

FIG. 4

| DATA ID | WRITTEN DATE | STORAGE PERIOD | STORED POSITION | STATE INFORMATION |
|---|---|---|---|---|
| 1 | 2008/1/1 | 2008/3/15 | /AAA/aaa | DELETED |
| 2 | 2008/2/2 | 2008/4/21 | /BBB/bbb | REGISTERED |
| 3 | 2008/3/3 | 2008/5/20 | /CCC/ccc | REGISTERED |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

FIG. 5

| DATA 5 | DATA 4 | DATA 3 | DATA 2 | DATA 1 |
| 08/09/30 | 08/06/11 | 08/05/20 | 08/04/21 | 08/03/15 |

FIG. 9

| DATA 1 | DATA 2 | DATA 3 | DATA 4 | DATA 5 |
|---|---|---|---|---|
| 08/03/15 | 08/04/21 | 08/05/20 | 08/06/11 | 08/09/30 |

STORAGE DEVICE AND STORAGE DEVICE CONTROL METHOD

CROSS-REFERENCE TO RELATED APPLICATIONS

This application is based upon and claims the benefit of priority of the prior Japanese Patent Application No. 2010-025978, filed on Feb. 8, 2010, the entire contents of which are incorporated herein by reference.

FIELD

Embodiments discussed herein relate to a storage device and a storage device control method.

BACKGROUND

In the related art, a storage device for archives which manages fixed contents is used in order to collectively store, for a long period of time, digital contents whose data is not to be modified, such as music, movie, e-mail, image, and document data. The storage device has a plurality of storage media (e.g., disks and tapes), and writes various digital contents (hereinafter, referred to as data) onto the storage media. In addition, according to a reference request from a user, the storage device reads stored data and transfers the data to a terminal of the user.

In such a storage device, when writing data onto a tape, data is written in order of data whose written date is early. For example, as shown in FIG. 9, a written date of data 1 is "08/03/15"; a written date of data 2 is "08/04/21"; a written date of data 3 is "08/05/20"; a written date of data 4 is "08/06/11"; and a written date of data 5 is "08/09/30".

In such a case, as shown in FIG. 9, the storage device writes data onto a tape in order of data whose written date is early, and thus data is stored on the tape in order of the data 1, the data 2, the data 3, the data 4, and the data 5.

In addition, in the storage device, when data whose storage period has elapsed is present on the tape, management information on the data whose storage period has elapsed is deleted, so that the user cannot refer to the data on the tape. Moreover, in the storage device, when deleting data itself on the tape, the data is overwritten multiple times in accordance with NCSC method (NCSC-TG-025) or United States Department of Defense method (DoD5220.22-M).

SUMMARY

According to an aspect of the embodiment, a storage device for storing data includes, a first storage part which stores data, a second storage part which stores backup data of the data stored in the first storage part, a writing order determination part which determines a writing order of data to the second storage part such that the writing order is an order from data whose storage period remains longest to data whose storage period remains shortest, and a writing control part which performs control such that the data stored in the first storage part is written to the second storage part in accordance with the writing order.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF DRAWINGS

FIG. 4 is a diagram illustrating an example of management information.
FIG. 5 is a diagram illustrating a data arrangement on a tape.
FIG. 9 is a diagram illustrating a data arrangement on an existing tape.

DESCRIPTION OF THE EMBODIMENT

Figure 1:
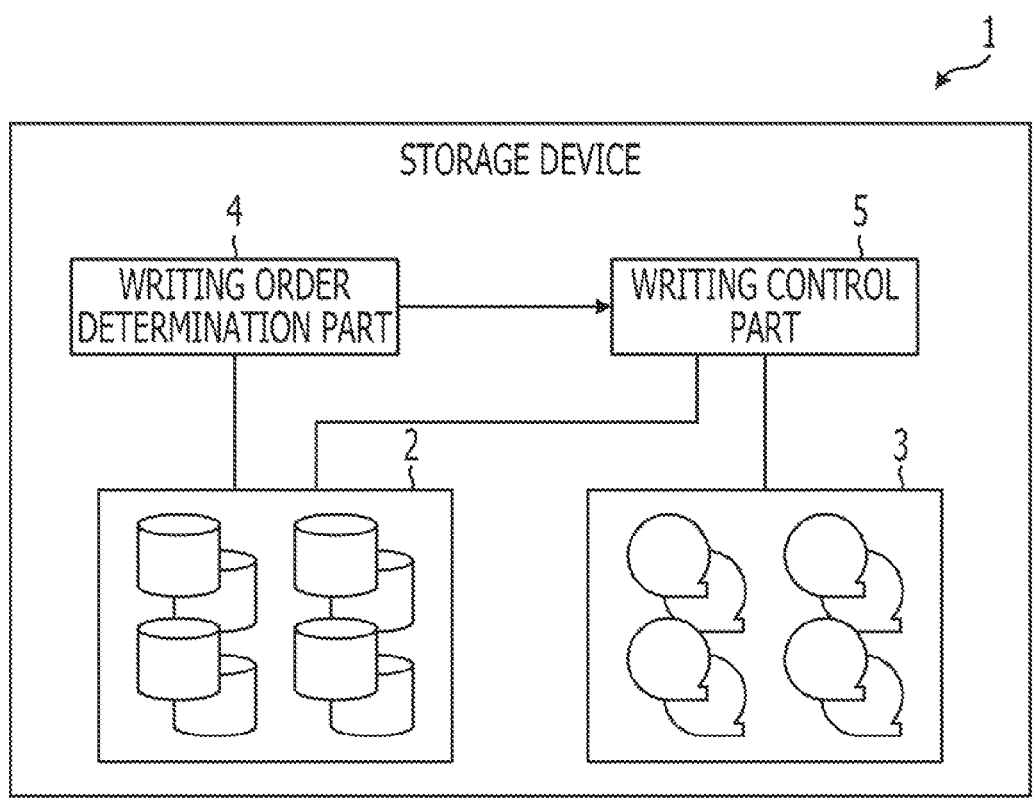
FIG. 1 is a block diagram illustrating a configuration of a storage device according to a first embodiment.

However, in a method in which the above management information is deleted so that the user cannot refer to the data on the tape, the data itself remains on the tape and cannot be deleted appropriately. Thus, for example, when data such as personal information is stored on the tape, even data whose storage period has elapsed remains physically on the tape, and the data cannot be deleted appropriately.

Further, when data is deleted in the method in which data is overwritten multiple times in accordance with NCSC method (NCSC-TG-025) or United States Department of Defense method (DoD5220.22-M), data behind the deleted data cannot be referred to due to a tape characteristic.

In other words, in the storage device, an end-of-file is assigned to data which is written onto the tape last. Thus, in the storage device, when data is overwritten and deleted, an end-of-file is assigned to the overwritten data. Thereafter, when the storage device receives a reference request for data behind the deleted data and performs a sequential access to the tape, the storage device detects the end-of-file of the overwritten data. As a result, the storage device cannot refer to the data behind the deleted data.

For example, giving a description with an example of FIG. 9, when a storage period of the data 2 has elapsed and the storage device deletes the data 2, the storage device overwrites the data 2 with new data by using NCSC method, and also assigns an end-of-file to the overwritten data. Thereafter, when the storage device receives a reference request for the data 5 and performs a sequential access to the tape, the storage device detects the end-of-file of the data 2 and ends the access. Thus, the storage device cannot refer to the data 5 behind the deleted data.

Embodiments of a storage device and a storage device control method according to the invention will be described in detail with reference to the accompanying drawings.

First Embodiment

First, a configuration of a storage device according to a first embodiment will be described with reference to FIG. 1. FIG.

1 is a diagram for illustrating the configuration of the storage device according to the first embodiment. As shown in FIG. 1, the storage device 1 according to the first embodiment includes a first storage part 2, a second storage part 3, a writing order determination part 4, and a writing control part 5.

The first storage part 2 stores data. The second storage part 3 stores backup data of the data stored in the first storage part 2. Note that, for the stored data, a storage period which is a time limit during which the data is stored is previously determined by a setting of a user or the like.

The writing order determination part 4 determines a writing order of data to the second storage part 3, such that the writing order is an order from data whose storage period remains longest to data whose storage period remains shortest. The writing control part 5 performs control so as to write the data stored in the first storage part 2 to the second storage part 3 in accordance with the writing order determined by the writing order determination part 4.

In this manner, the storage device 1 writes data to the second storage part 3 in the order from data whose storage period remains longest, and thus data whose storage period elapses early is present in the rear of the tape. As a result, data may be deleted from the rear of the tape. Therefore, in the storage device 1, even when data whose storage period has elapsed is deleted, it does not influence data whose storage period has not elapsed, and it is possible to access remaining data in the second storage part 3.

As described above, according to the first embodiment, the storage device 1 determines the writing order of data to the second storage part 3 such that the writing order is an order from data whose storage period remains longest to data whose storage period remains shortest, and sequentially reads data whose storage period remains longest, from the first storage part 2 in accordance with the determined writing order. Then, the storage device 1 performs control so as to write the read data to the second storage part 3. Thus, even when data whose storage period has elapsed is deleted, it is possible to normally access the remaining data on the same tape medium.

Second Embodiment

In a second embodiment, a configuration and a flow of a process of a storage device according to the second embodiment will be described, and advantages provided by the second embodiment will be described lastly.

[Configuration of Storage Device]

Figure 2:
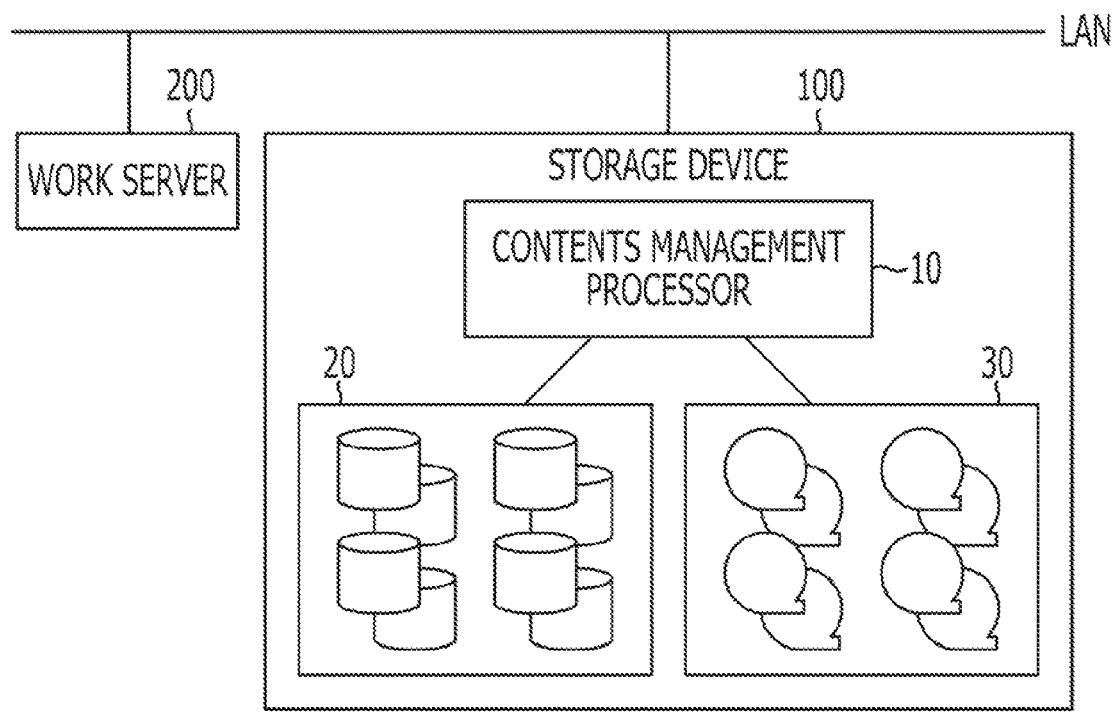
FIG. 2 is a diagram illustrating a system including a storage device according to a second embodiment.

Next, a configuration of a system including a storage device 100 will be described with reference to FIG. 2. FIG. 2 is a diagram illustrating the system including the storage device according to the second embodiment. As shown in FIG. 2, the system including the storage device 100 includes the storage device 100 and a work server 200 which are connected to each other via a LAN.

The storage device 100 stores data received from the work server 200 connected thereto via the LAN. In addition, the work server 200 makes a request to the storage device 100 for storing various digital contents.

The storage device 100 includes a contents management processor 10, a storage 20, and a tape library 30. The contents management processor 10 manages digital contents (hereinafter, referred to as data). Note that the contents management processor 10 will be described in detail later with reference to FIG. 3.

In addition, the storage 20 has a plurality of magnetic disks and SSDs and is used as a storage medium for storing storage request data. The tape library 30 has a plurality of magnetic tapes and is used as a storage medium for backup for data stored in the storage 20.

Figure 3:
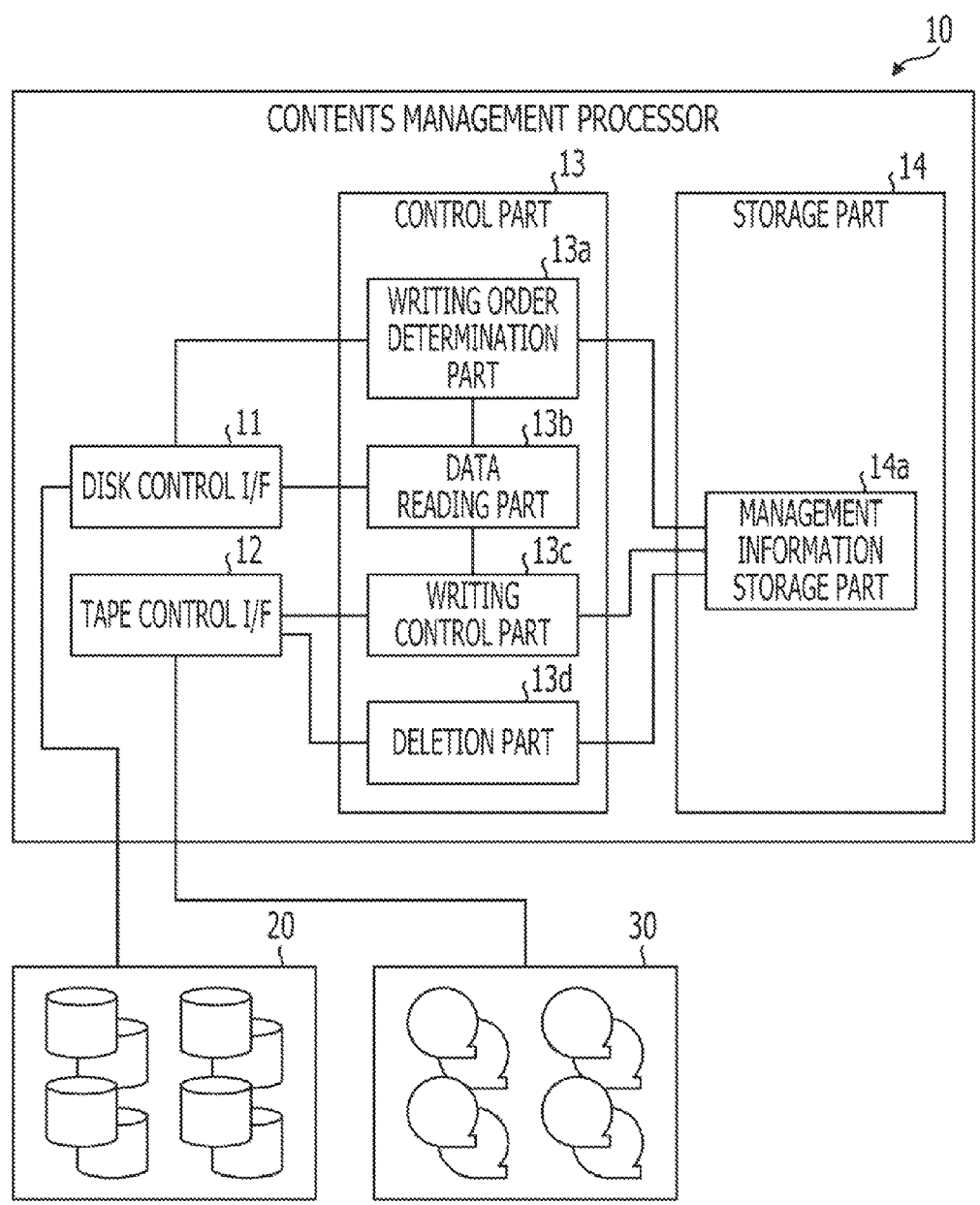
FIG. 3 is a block diagram illustrating a configuration of the storage device according to the second embodiment.

Next, a configuration of the contents management processor 10 in the storage device 100 will be described with reference to FIG. 3. FIG. 3 is a block diagram illustrating a configuration of the storage device 100 according to the second embodiment. As shown in FIG. 3, the contents management processor 10 includes a disk control I/F 11, a tape control I/F 12, a control part 13, and a storage part 14, and is connected to the storage 20 and the tape library 30 via a bus or the like. The following will describe a process of each part.

The disk control I/F 11 controls communication regarding various information which is exchanged with the connected storage 20. Specifically, the disk control I/F 11 sends or receives contents data to or from the storage 20. The tape control I/F 12 controls communication regarding various information which is exchanged with the connected tape library 30. Specifically, the tape control I/F 12 sends or receives backup data of the data stored in the storage 20, to or from the tape library 30.

The storage part 14 stores data and programs required for various processes performed by the control part 13, and has a management information storage part 14a. The management information storage part 14a stores management information on contents data stored in the storage 20 and the tape library 30.

Specifically, as shown in FIG. 4, the management information storage part 14a stores "data ID" for uniquely identifying data, "written date" indicating date when data is written, and "storage period" indicating a time limit during which data is stored. In addition, the management information storage part 14a stores "stored position" indicating a position where data is stored, and "state information" indicating a state, such as a state where data is registered or a state where data is deleted. FIG. 4 is a diagram illustrating an example of the management information.

The control part 13 controls an access process performed by the storage device 100, and includes a writing order determination part 13a, a data reading part 13b, a writing control part 13c, and a deletion part 13d.

The writing order determination part 13a determines a writing order of data to the tape library 30, such that the writing order is an order from data whose storage period remains longest to data whose storage period remains shortest. Specifically, when selecting tape writing target files which are files to be written onto a tape, the writing order determination part 13a obtains information of the storage period of each file from the management information storage part 14a. Then, using the information of the storage period, the writing order determination part 13a determines a tape writing order such that the tape writing order is an order from data whose storage period remains longest to data whose storage period remains shortest, and notifies the data reading part 13b of the determined order.

The data reading part 13b sequentially reads, from a disk of the storage 20, data whose storage period remains longest. Specifically, the data reading part 13b receives the tape writing order from the writing order determination part 13a, reads data whose storage period remains longest, from the disk of the storage 20 in accordance with the received tape writing order, and notifies the writing control part 13c of the read data.

The writing control part 13c performs control so as to write the data read by the data reading part 13b, to the tape library 30. Specifically, until all data is written, the writing control part 13c repeats a process of writing read real data and management information (metadata) onto the tape.

In other words, the writing control part 13c writes data onto the tape of the tape library 30 in the order from data whose storage period remains longest to data whose storage period remains shortest. Here, a data arrangement on the tape of the tape library 30 will be described with reference to FIG. 5. FIG. 5 is a diagram illustrating the data arrangement on the tape. For example, as shown in FIG. 5, regarding the data stored on the tape of the tape library 30, the storage period of data 5 is "08/09/30"; the storage period of data 4 is "08/06/11"; the storage period of data 3 is "08/05/20"; the storage period of data 2 is "08/04/21"; and the storage period of data 1 is "08/03/15".

In such a case, as shown in FIG. 5, the writing control part 13c writes the data onto the tape of the tape library 30 in the order from data whose storage period remains longest to data whose storage period remains shortest, and thus stores the data onto the tape of the tape library 30 in the order of the data 5, the data 4, the data 3, the data 2, and the data 1.

As described above, since the storage device 100 writes the data to the tape library 30 in the order from data whose storage period remains longest, data whose storage period elapses early is present in the rear of the tape. Thus, the storage device 100 may delete data from the rear of the tape. Therefore, it does not influence data whose storage period has not elapsed. Even when data whose storage period has elapsed is deleted, it is possible to normally access the remaining data in the second storage part 3.

In other words, even when the storage device 100 overwrites and deletes data whose storage period has elapsed, an end-of-file is assigned to the rearmost data, and thus it is possible to normally access the remaining data on the same tape. In addition, when data whose storage period remains short is newly stored, the data is stored in the rear of the tape, whereby the tape may be effectively used.

The deletion part 13d deletes data stored in the tape library 30. Specifically, on the basis of the management information stored in the management information storage part 14a, the deletion part 13d identifies data whose storage period has elapsed, and also identifies a position, on the tape, of the data whose storage period has elapsed. Then, the deletion part 13d deletes the tape data from the tape library 30, and deletes the management information from the management information storage part 14a. Note that the deletion part 13d overwrites data multiple time and deletes the data in accordance with NCSC method (NCSC-TG-025) or United States Department of Defense method (DoD5220.22-M) as a deletion method.

[Process Performed by Storage Device]

Figure 6:
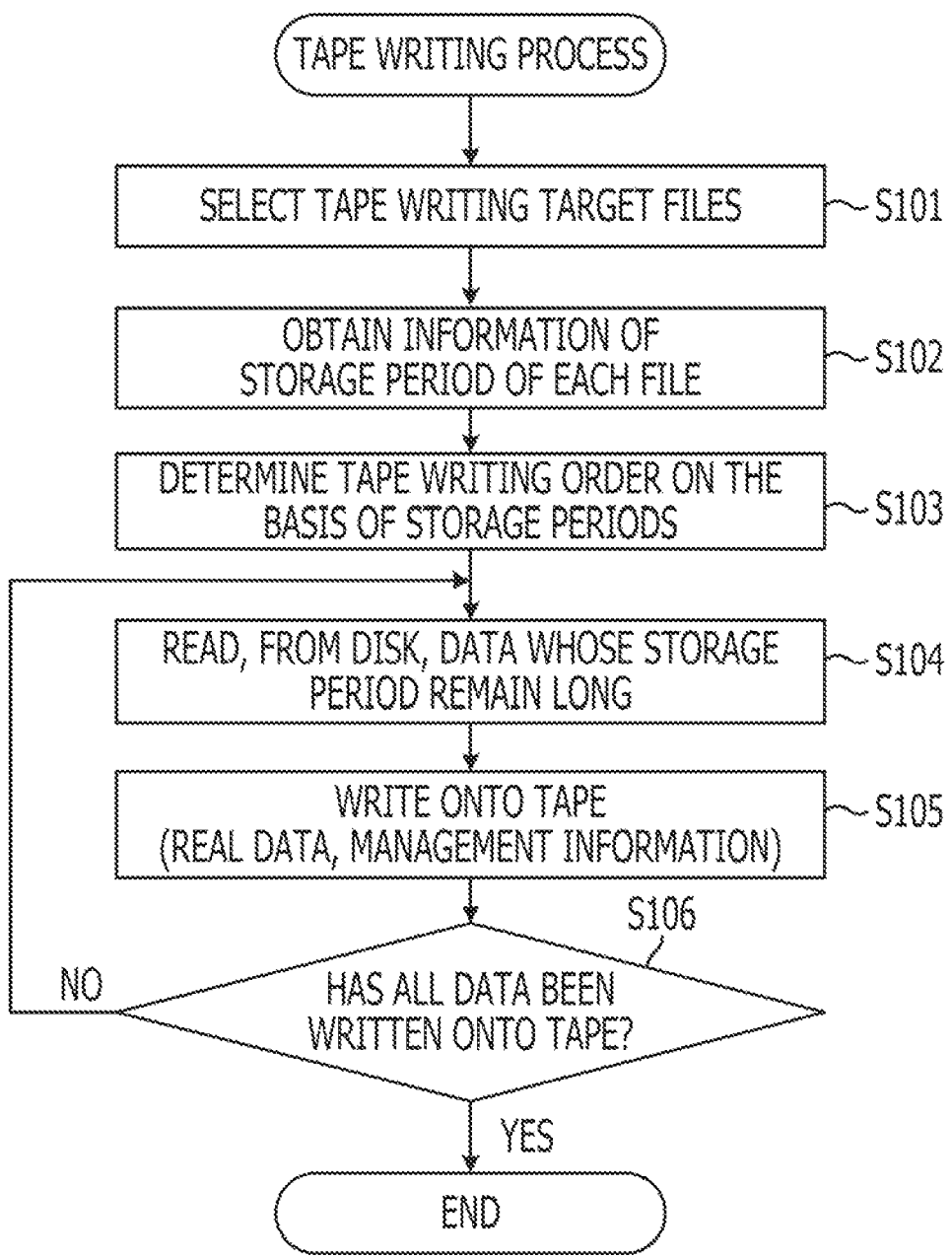
FIG. 6 is a flowchart illustrating a procedure of a writing process of the storage device according to the second embodiment.
Figure 7:
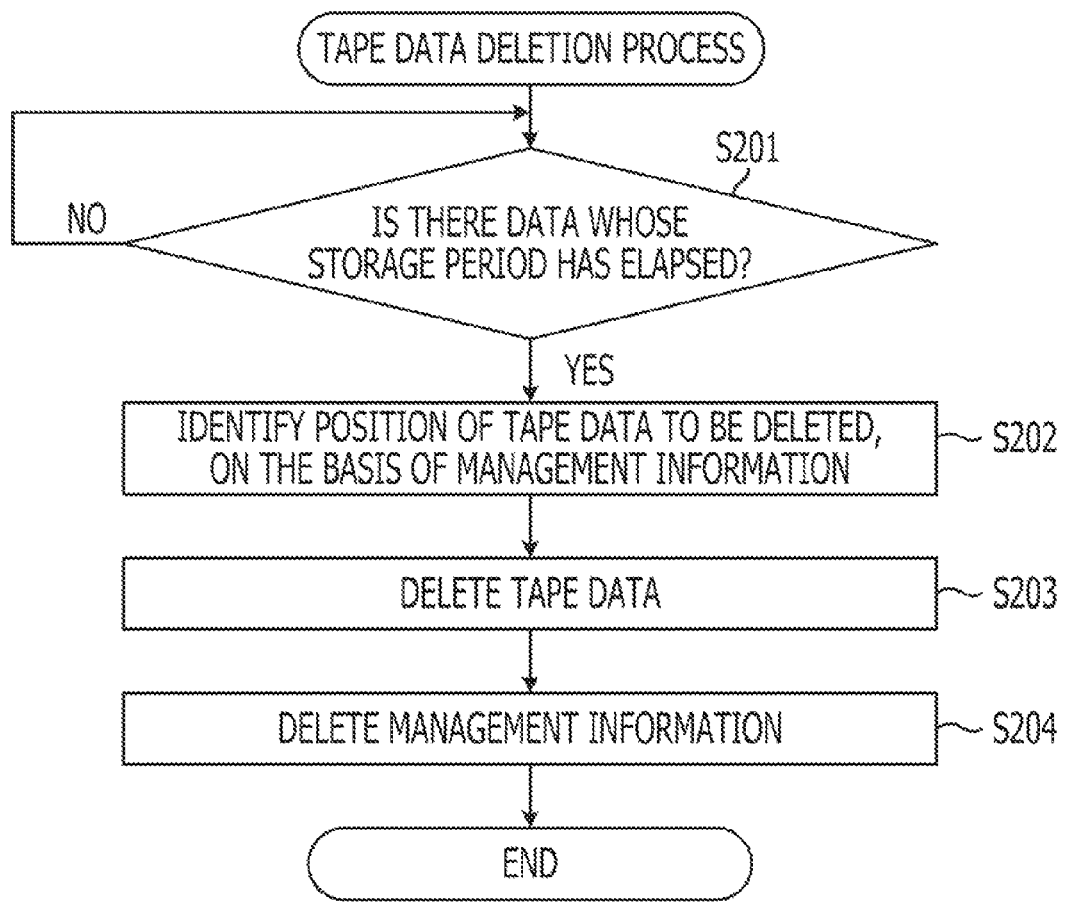
FIG. 7 is a flowchart illustrating a procedure of a deletion process of the storage device according to the second embodiment.

Next, a process performed by the storage device 100 according to the second embodiment will be described with reference to FIGS. 6 and 7. FIG. 6 is a flowchart illustrating a procedure of a writing process of the storage device according to the second embodiment. FIG. 7 is a flowchart illustrating a deletion process of the storage device according to the second embodiment.

As shown in FIG. 6, the storage device 100 selects tape writing target files which are files to be written onto the tape (S101), and then obtains information of the storage period of each file from the management information storage part 14a (S102). Then, the storage device 100 determines a tape writing order in accordance with the storage periods (S103). Specifically, the storage device 100 determines a tape writing order such that the tape writing order is an order from data whose storage period is recent (namely, data whose storage period remains longest) to data whose storage period is early.

Then, the storage device 100 reads data whose storage period remains longest, from the disk in accordance with the tape writing order (S104), and writes the read data onto the tape (S105). Thereafter, the storage device 100 determines whether or not all the data has been written (S106). When all the data has not been written (No at S106), the storage device 100 returns to step S104, and repeats a process of: reading data whose storage period remains longest, in accordance with the tape writing order (S104); and writing real data and management information (metadata) onto the tape (S105). On the other hand, when all the data has been written (Yes at S106), the storage device 100 ends the tape writing process.

Subsequently, the procedure of the deletion process of the storage device according to the second embodiment will be described with reference to FIG. 7. As shown in FIG. 7, the storage device 100 determines whether or not there is data whose storage period has elapsed, on the basis of the storage periods stored in the management information storage part 14a. As a result, when determining that there is data whose storage period has elapsed (Yes at S201), the storage device 100 identifies the position of the tape data to be deleted, on the basis of the management information (S202) in order to delete the data whose storage period has elapsed. Then, the storage device 100 deletes the tape data (S203), deletes the management information regarding this data (S204), and ends the tape data deletion process.

Advantages of Second Embodiment

As described above, the storage device 100 includes: the storage 20 which stores data; and the tape library 30 which stores backup data of the data stored in the storage 20. The storage device 100 determines a writing order of data to the tape library 30, such that the writing order is an order from data whose storage period remains longest to data whose storage period remains shortest, and sequentially reads data whose storage period remains longest, from the storage 20 in accordance with the determined writing order. Thereafter, the storage device 100 performs control so as to write the read data to the tape library 30. Thus, the storage device 100 writes data onto the tape medium in the order from data whose storage period remains longest, and hence it is possible to normally access the remaining data on the same tape medium, even when data whose storage period has elapsed is deleted.

Further, according to the second embodiment, the storage device 100 includes the management information storage part 14a which stores the management information indicating the storage period of the data. By using the management information stored in the management information storage part 14a, the storage device 100 may determine a writing order of data to the tape library 30 such that the writing order is an order from data whose storage period remains longest to data whose storage period remains shortest. Thus, the storage device 100 may manage the storage period of each data and write the data onto the tape medium in the order from data whose storage period remains longest.

Moreover, according to the second embodiment, the storage device 100 may identify data whose storage period has elapsed, on the basis of the management information stored in the management information storage part, and may delete the data whose storage period has elapsed. Thus, the storage device 100 may appropriately delete the data whose storage period has elapsed.

Third Embodiment

Although the first and second embodiments have been described above, various different embodiments may be implemented in addition to the above-described embodiments. Now, another embodiment included in the invention will be described as a third embodiment below.

(1) System Configuration and the Like

Each component of each apparatus shown in the drawings is functionally conceptual, and does not necessarily need to be physically configured as shown in the drawings. In other words, the specific mode of dispersion and integration of each apparatus is not limited to the illustrated one, and all or a part thereof may be functionally or physically dispersed or integrated in an optional unit according to various types of loads and the state of use. For example, the writing order determination part 13a and the data reading part 13b may be integrated. In addition, all or some of the processing functions performed in each apparatus may be implemented by a CPU and a program which is analyzed and executed by the CPU, or may be implemented as hardware based on wired logic.

(2) Program

Figure 8:
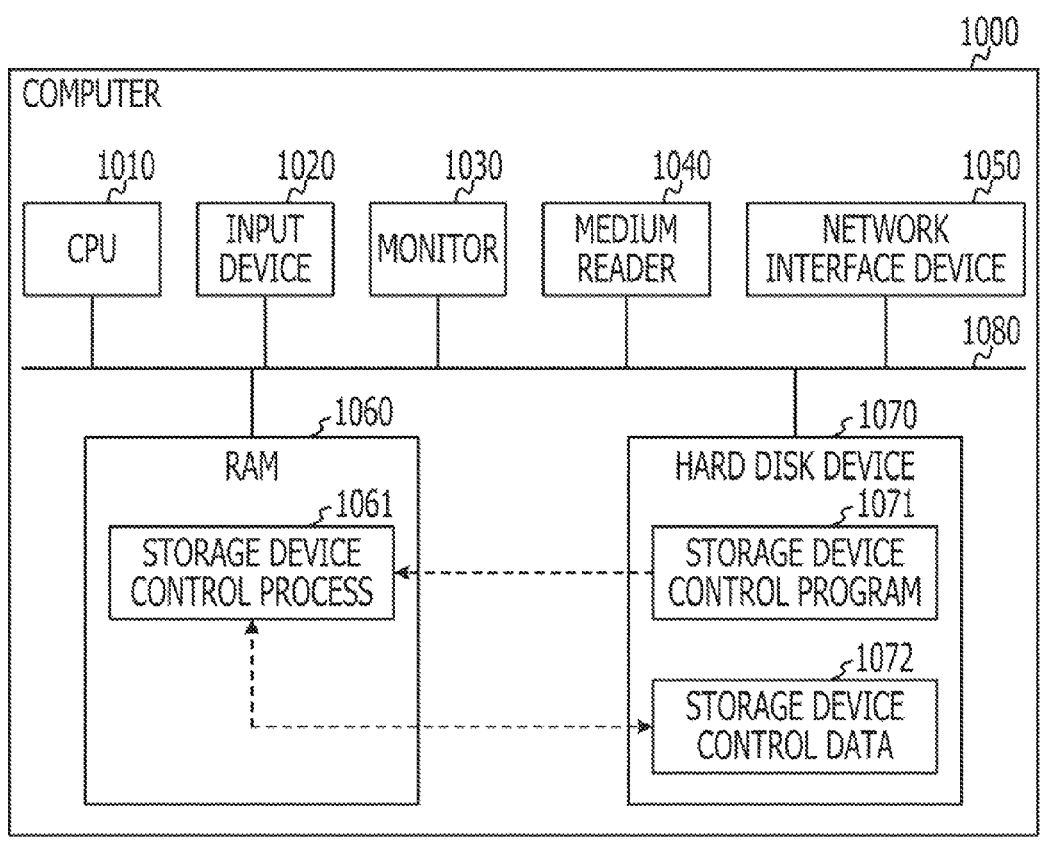
FIG. 8 is a diagram illustrating a computer which executes a storage device control program.

Further, each process described in the above embodiments may be implemented by a previously-prepared program being executed by a computer such as a personal computer or a work station. Hereinafter, an example of a computer executing a storage device control program which has substantially the same function as that in the above embodiments will be described with reference to FIG. 8. FIG. 8 is a diagram illustrating a computer 1000 which executes the storage device control program.

As shown in FIG. 8, the computer 1000 includes: a CPU (central processing unit) 1010 which executes various arithmetic processes; an input device 1020 which receives an input of data from a user; a monitor 1030 which displays various information; a medium reader 1040 which reads a program or the like from a recording medium; a network interface device 1050 which exchanges data with another computer via a network; a RAM (random access memory) 1060 which temporarily stores various information; and a hard disk device 1070. These components are connected to each other via a bus 1080.

In the hard disk device 1070, a storage device control program 1071 having substantially the same function as the functions for the writing order determination part 4, and the writing control part 5 shown FIG. 1 and that of the control part 13 shown in FIG. 3 is stored. In addition, in the hard disk device 1070, storage device control data 1072 corresponding to various data stored in the storage part 14 shown in FIG. 3 is stored. Note that the storage device control data 1072 may be dispersed as appropriate and may be stored in another computer connected via a network.

The CPU 1010 reads the storage device control program 1071 from the hard disk device 1070 and expands the storage device control program 1071 on the RAM 1060, whereby the storage device control program 1071 functions as a storage device control process 1061. Then, the storage device control process 1061 expands information and the like which are read from the storage device control data 1072, to a region, on the RAM 1060, which is allocated to the storage device control process 1061 as appropriate, and performs various data processes on the basis of the expanded data and the like.

The storage device control program 1071 does not necessarily need to be stored in the hard disk device 1070, and the computer 1000 may read this program stored in a storage medium such as CD-ROM, and may execute this program. Alternatively, this program may be previously stored in another computer (or server) connected to the computer 1000 via a public line, the Internet, a LAN, a WAN (wide area network), or the like, and the computer 1000 may read this program from them and may execute this program.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

The invention claimed is:

1. A storage device for storing data, comprising:
a storage part which stores data;
a tape library which stores backup data of the data stored in the storage part, the tape library including a magnetic tape;
a writing order determination part which determines a writing order of data stored in the storage part to the tape library such that the writing order is an order from data having a longest remaining storage period to data having a shortest remaining storage period, the storage period being set by a user of the storage device; and
a writing control part which performs control such that the data stored in the storage part is written to the magnetic tape of the tape library in accordance with the writing order determined by the writing order determination part, the writing control part writing the data having the longest remaining storage period into the magnetic tape of the tape library first in accordance with the determined writing order, the writing control part writing the data having the shortest remaining storage period into the magnetic tape of the tape library last in accordance with the determined writing order,
wherein an end-of-file is assigned to the data having the shortest remaining storage period written in the magnetic tape of the tape library last.

2. The storage device according to claim 1, further comprising a management information storage part which stores management information indicating a storage period of the data, wherein
the writing order determination part determines, by using the management information stored in the management information storage part, a writing order of data to the tape library such that the writing order is an order from data having the longest remaining storage period to data having the shortest remaining storage period.

3. The storage device according to claim 2, further comprising a deletion part which identifies data whose storage period has elapsed, on the basis of the management information stored in the management information storage part, and deletes the data whose storage period has elapsed.

4. A control method of a storage device, comprising:
determining a writing order of data to a tape library which stores backup data for data stored in a first storage part, the tape library including a magnetic tape, such that the writing order is an order from data having a longest remaining storage period to data having a shortest remaining storage period, the storage period being set by a user of the storage device; and
performing control such that the data stored in the storage part is written to the magnetic tape of the tape library in accordance with the determined writing order, the performing including:
writing the data having the longest remaining storage period into the magnetic tape of the tape library first in accordance with the determined writing order, and writing the data having the shortest remaining storage period into the magnetic tape of the tape library last in accordance with the determined writing order, and assigning an end-of-file to the data having the shortest remaining storage period written into the magnetic tape of the tape library last.

5. The control method according to claim 4, further comprising storing management information indicating a storage period of the data, wherein when determining the writing order, an order of writing data to the tape library is determined such that the data is written in order from data having the longest remaining storage period, as obtained from the stored management information, to data having the shortest remaining storage period, as also obtained from the stored management information.

6. The control method according to claim 5, further comprising:

identifying data whose storage period has elapsed, on the basis of the stored management information; and deleting the data whose storage period has elapsed.

* * * * *